US010925220B2

(12) United States Patent
Lavenberg

(10) Patent No.: US 10,925,220 B2
(45) Date of Patent: Feb. 23, 2021

(54) VEGETATIVE SUPPORT AND HIGH STRESS TRAINING CULTIVATION APPARATUS

(71) Applicant: William Alexander Lavenberg, Denver, CO (US)

(72) Inventor: William Alexander Lavenberg, Denver, CO (US)

( * ) Notice: Subject to any disclaimer, the term of this patent is extended or adjusted under 35 U.S.C. 154(b) by 263 days.

(21) Appl. No.: 16/161,923

(22) Filed: Oct. 16, 2018

(65) Prior Publication Data

US 2019/0133054 A1  May 9, 2019

Related U.S. Application Data

(60) Provisional application No. 62/547,711, filed on Aug. 18, 2017.

(51) Int. Cl.
| | | |
|---|---|---|
| *A01G 17/04* | (2006.01) | |
| *A01G 13/02* | (2006.01) | |
| *A01G 17/10* | (2006.01) | |

(52) U.S. Cl.
CPC ......... *A01G 17/04* (2013.01); *A01G 13/0243* (2013.01); *A01G 17/10* (2013.01); *A01G 13/0237* (2013.01)

(58) Field of Classification Search
CPC . A01G 2/30; A01G 9/12; A01G 9/128; A01G 13/0243; A01G 13/0237; A01G 17/04; A01G 17/08; A01G 17/10; A01G 17/14
See application file for complete search history.

(56) References Cited

U.S. PATENT DOCUMENTS

| | | | | |
|---|---|---|---|---|
| 1,875,561 | A | | 9/1932 | Cirrito |
| 2,413,487 | A | * | 12/1946 | Dockry .................... A01G 2/30 47/32.5 |
| 2,462,442 | A | * | 2/1949 | Wallace ................. A47G 33/04 248/538 |

(Continued)

FOREIGN PATENT DOCUMENTS

| | | | |
|---|---|---|---|
| KR | 20060096349 A | * 9/2006 | |
| WO | WO-2010150632 A1 | * 12/2010 | ............... A01G 9/12 |

OTHER PUBLICATIONS

68grasshopper; "blackberry kush and nnazar," Apr. 9, 2016; autoflower. net forums; forum post #76. (Year: 2016).*

*Primary Examiner* — Monica L Barlow
*Assistant Examiner* — Michael A. Fabula
(74) *Attorney, Agent, or Firm* — Williams Intellectual Property; Benjamin F. Williams

(57) ABSTRACT

A vegetative support and high stress training cultivation apparatus includes a body member having a continuous channel wrought in an upward surface thereof. A first portion of the body member is disposed at 100° to 110° relative a second portion of the body member. A plant limb is securable into the continuous channel by action of each of a pair of hook and loop fastening bands attached to the body member and devised to secure overtop the plant limb and maintain the limb interior to the continuous channel whereby the plant limb is caused to bend between 100° to 110° over a knee-bend. A triangular bracket disposed on an undersurface of the body member enables hooking engagement to existing lines strung to anchor the plant limbs along projected trajectories. The body member is readily installable and removable without damaging the plant.

8 Claims, 7 Drawing Sheets

(56) References Cited

U.S. PATENT DOCUMENTS

| | | | |
|---|---|---|---|
| 3,521,401 | A | 7/1970 | Shisler |
| 3,826,040 | A | 7/1974 | Roberts et al. |
| 4,254,579 | A | 3/1981 | Flynn |
| 4,779,375 | A | 10/1988 | Harder |
| 4,922,653 | A * | 5/1990 | Stone ............... A01G 17/04 47/45 |
| H000824 | H | 10/1990 | Ghafoorzai |
| 5,252,072 | A | 10/1993 | Sasaki |
| 5,293,713 | A * | 3/1994 | Ahmed ............... A01G 5/04 24/561 |
| 5,425,203 | A | 6/1995 | Scott |
| 5,446,993 | A * | 9/1995 | Cullen ............ A01G 27/006 47/40.5 |
| 5,501,038 | A | 3/1996 | Gregoranto |
| 5,752,341 | A | 5/1998 | Goldfarb |
| 6,233,869 | B1 | 3/2001 | Dearo |
| 8,250,810 | B2 | 8/2012 | Van Ziji |
| D775,518 | S | 1/2017 | Torres Carpio |
| 10,595,471 | B2 * | 3/2020 | Gilley ............... A01G 9/128 |
| 2002/0124464 | A1 | 9/2002 | Taylor |
| 2005/0044786 | A1 * | 3/2005 | Mastronardi ........ A01G 9/128 47/47 |
| 2012/0175469 | A1 * | 7/2012 | Weder ............... A47G 7/02 248/27.8 |
| 2012/0227318 | A1 | 9/2012 | Harger |
| 2014/0075836 | A1 * | 3/2014 | Buck ............... A01G 17/10 47/42 |
| 2014/0115964 | A1 * | 5/2014 | Akana ............... A01G 7/06 47/1.01 S |
| 2014/0144076 | A1 * | 5/2014 | Deeb ............... A01G 9/122 47/47 |
| 2014/0338260 | A1 | 11/2014 | Selezeanu |
| 2016/0295811 | A1 * | 10/2016 | Rider ............... A01G 9/128 |
| 2016/0345511 | A1 * | 12/2016 | Akana ............... A01G 7/06 |
| 2017/0064910 | A1 | 3/2017 | Newton |
| 2018/0249643 | A1 * | 9/2018 | Akana ............... A01G 9/128 |

* cited by examiner

VEGETATIVE SUPPORT AND HIGH STRESS TRAINING CULTIVATION APPARATUS

CROSS-REFERENCE TO RELATED APPLICATIONS

This nonprovisional application claims the benefit of provisional application No. 62/547,711 filed on Aug. 18, 2017.

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various apparatuses for inducing stress training in flowering plants are known in the prior art. Most include means to tie off plant limbs to external cages and engage limbs to lines strung at various heights and angles. The desired result is to space limbs apart, to reduce competition for light and space, while causing additional meristems to activate and shoot up additional, new growth trainable along the same limb. Thus greater yields may be engendered and a single plant caused to produce yields approximating several single plants.

Most such devices for stress training, however, are rudimentary and are essentially tied to the plant or forced around the plant to maintain the desired divergence of limb growth along a desired growth trajectory. While widely available and commonly applied, such techniques are less than ideal as the need to move plants, or otherwise reconfigure the limbs, involves often tedious and time-consuming processes to extricate the limbs from the apparatuses and contrivances used to force the limbs apart into divergent growth trajectories.

What is needed is a vegetative support and high stress training cultivation apparatus, minimized for size but maximized for effect in causing divergent growth, that enables ready installation and easy removal to train a targeted limb to grow diverged at 100° to 110° from its natural trajectory, while allowing a user to quickly remove or alter the position of such apparatus to effect greater diversity of limbs along projected growth trajectories, while enabling reuse of the apparatus again and again.

FIELD OF THE INVENTION

The present vegetative support and high stress training cultivation apparatus has been devised to assist in the cultivation of increased yields of flowering and other plants. The present vegetative support and high stress training cultivation apparatus enables rapid installation to a targeted limb to force divergence of the limb between 100° and 110° from said limb's natural growth trajectory and thus force spreading of the plant limbs to reduce competition for immediate light and enable greater growth of denser and more numerous flowers therebetween.

The present vegetative support and high stress training cultivation apparatus is lightweight and devised to maximize growth divergence and trainability of a plant while minimizing the size and materials used to comprise the apparatus. The apparatus is further devised not to damage or injure the plant, but releasably fasten to a targeted limb while enabling accommodation of future growth. Further, the present vegetative support and high stress training cultivation apparatus is usable to support or prop up broken or damaged limbs and may serve to enable strengthening across a broken section of a limb.

SUMMARY OF THE INVENTION

The present vegetative support and high stress training cultivation apparatus has been devised to enable controlled growth of vegetation along predetermined growth lines, away from the perpendicular and along near-horizontal trajectories, to thereby increase yield by forcing outcroppings of growth trainable along laterally distended limbs.

Stress training increases yields by forcing plant limbs along more horizontal trajectories whereby additional growth is accommodated upwards from the limb itself, thus causing the limb to support more outcroppings of new growth. Means for tying down limbs and directing growth along projected trajectories include use of weights and strings, but such are typically cumbersome to install and remove. As trained limbs continue to grow and send up more shoots, frequent correction is required to compensate for new growth. Thus what is needed is a vegetative support and high stress training cultivation apparatus that is expediently installable and removable to a plant limb while readily engaging to guide lines strung to define projected growth trajectories.

The present vegetative support and high stress training cultivation apparatus, therefore, includes a body member adapted to cradle a plant limb interior to a continuous channel wrought longitudinally upon an upward side thereof. The body member includes a first portion and a second portion, disposed at 100° to 110° relative one another on either side of a knee-bend. The plant limb is securable interior to the continuous channel by action of hook and loop fastening bands that fasten transversely across the continuous channel overtop the limb to maintain the limb fast interior to the channel. The limb is thus forced, across the knee-bend, to bend at between 100° and 110°. Once the limb has adopted this position, the body member is readily removable by simply unfastening the hook and loop fastening bands.

To enable attachment to guide lines strung to direct growth along projected growth trajectories, the body member includes an underside whereon a triangular bracket is disposed, said triangular bracket having a vertex disposed immediately underlying the knee-bend and a hypotenuse strung between the first portion and the second portion. An aperture is disposed within the triangular bracket and a gap is disposed in the hypotenuse conjoined the aperture, whereby a line strung along a projected growth trajectory is readily engaged interior to the aperture by passing the line through the gap and effectively hooking the body member to the line. Thus the body member may be removably attached to a guide line tensioned at a particular height and position to guide growth along projected trajectories.

Limbs may be thus spread apart and diverged from the main trunk or stem and thereby caused to occupy less shaded areas, for example, unimpeded by preexisting or future growth, and caused to grow along predetermined growth trajectories to maximize production of flowers of greater number and density. Yield is therefore dramatically increasable.

Thus has been broadly outlined the more important features of the present vegetative support and high stress training cultivation apparatus so that the detailed description thereof that follows may be better understood and in order that the present contribution to the art may be better appreciated.

Objects of the present vegetative support and high stress training cultivation apparatus, along with various novel features that characterize the invention are particularly pointed out in the claims forming a part of this disclosure. For better understanding of the vegetative support and high stress training cultivation apparatus, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
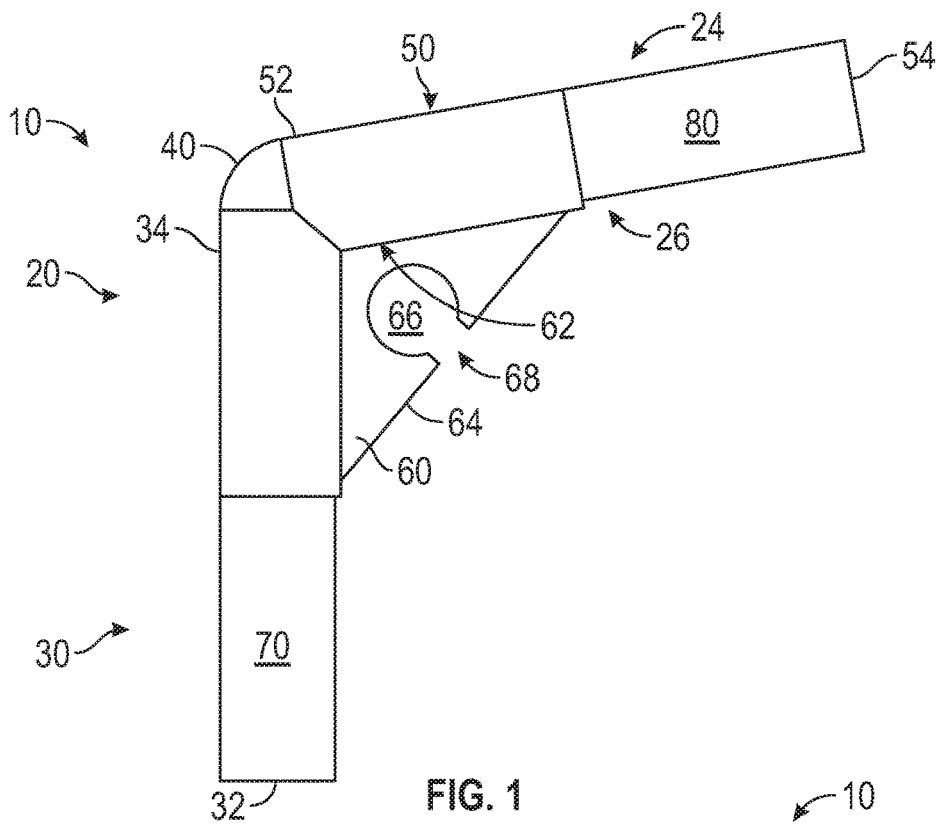
FIG. 1 is a side elevation view of an example embodiment.
Figure 2:
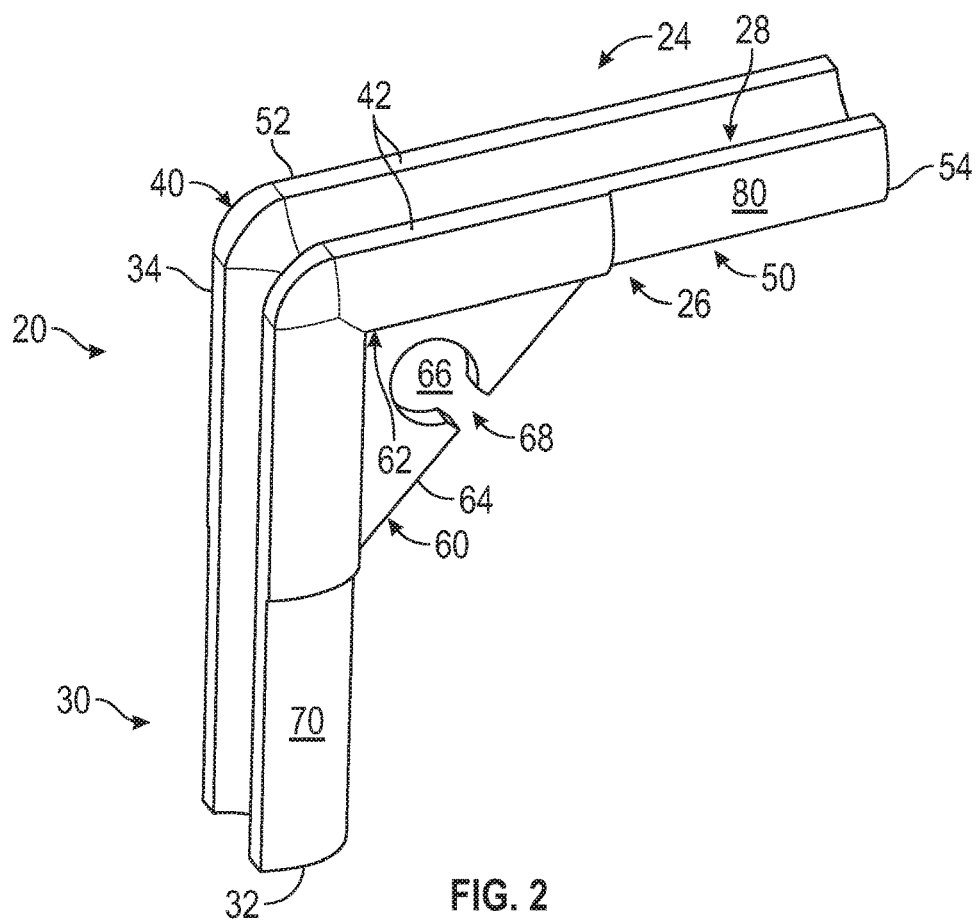
FIG. 2 is an isometric view of an example embodiment.
Figure 3:
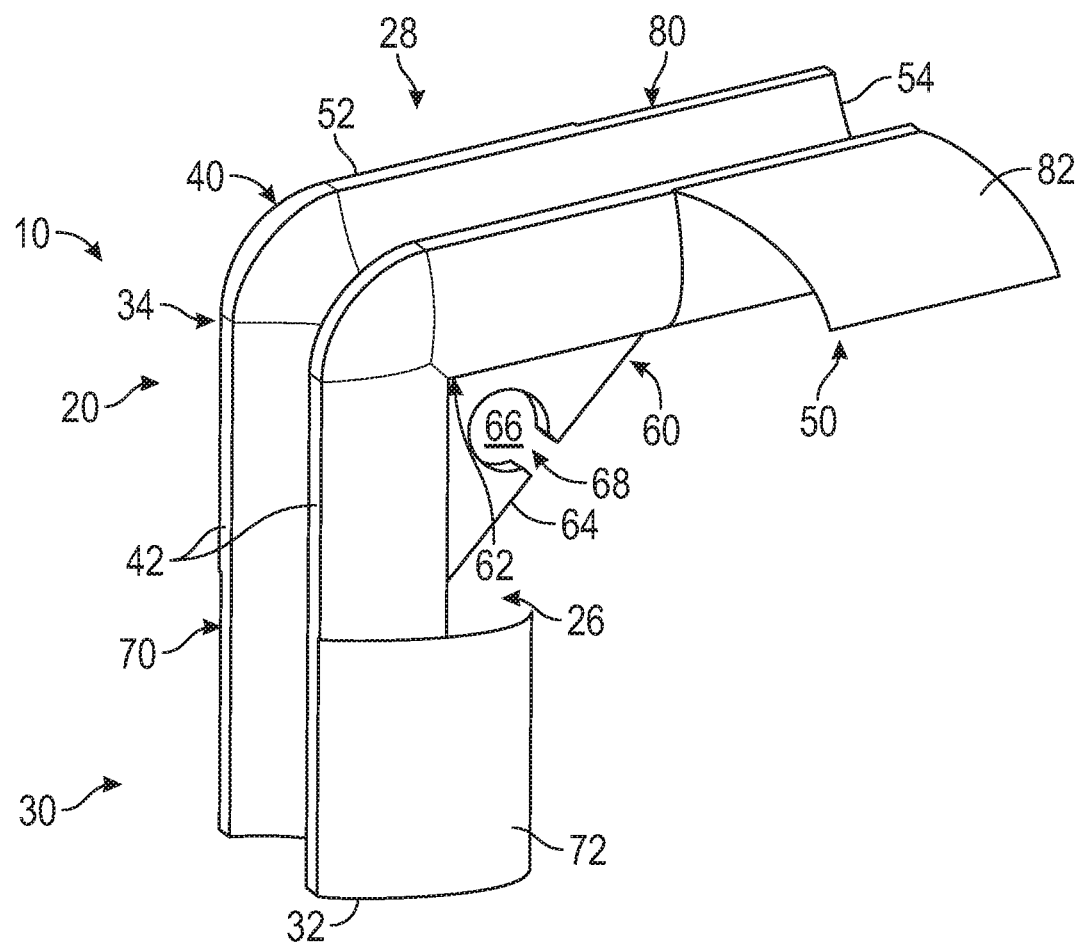
FIG. 3 is an isometric view of an example embodiment having each of a first and second hook and loop fastening band disposed flushly upon each of a first and second recessed portion respectively.
Figure 4:
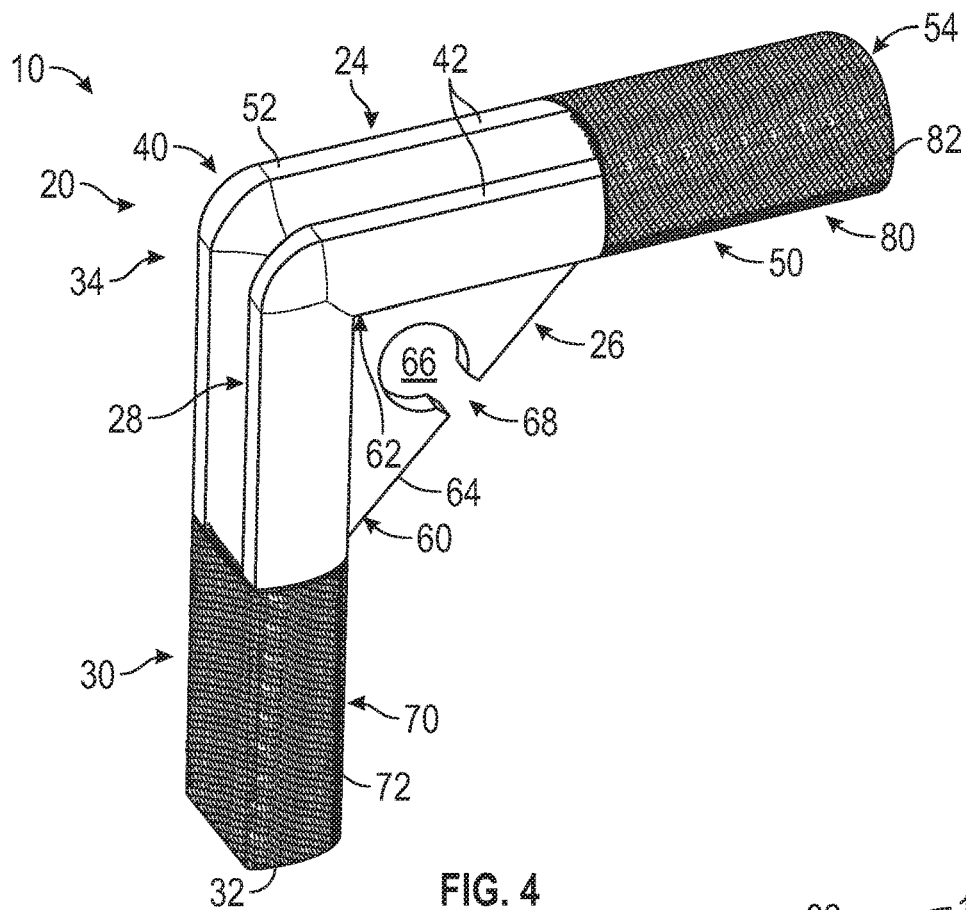
FIG. 4 is an isometric view of an example embodiment having each of the first and second hook and loop fastening band disposed in flushly upon each of a first and second recessed portion respectively.
Figure 5:
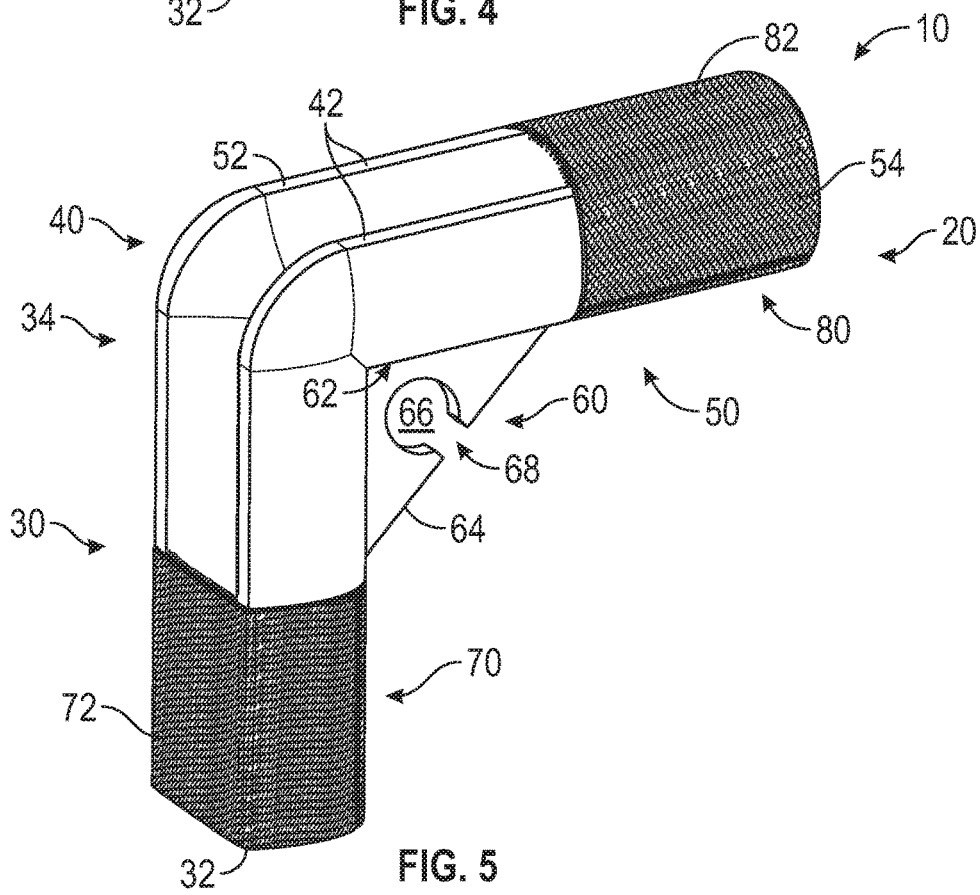
FIG. 5 is an isometric view of an larger example embodiment having each of the first and second hook and loop fastening band disposed in flushly upon each of a first and second recessed portion respectively.
Figure 6:
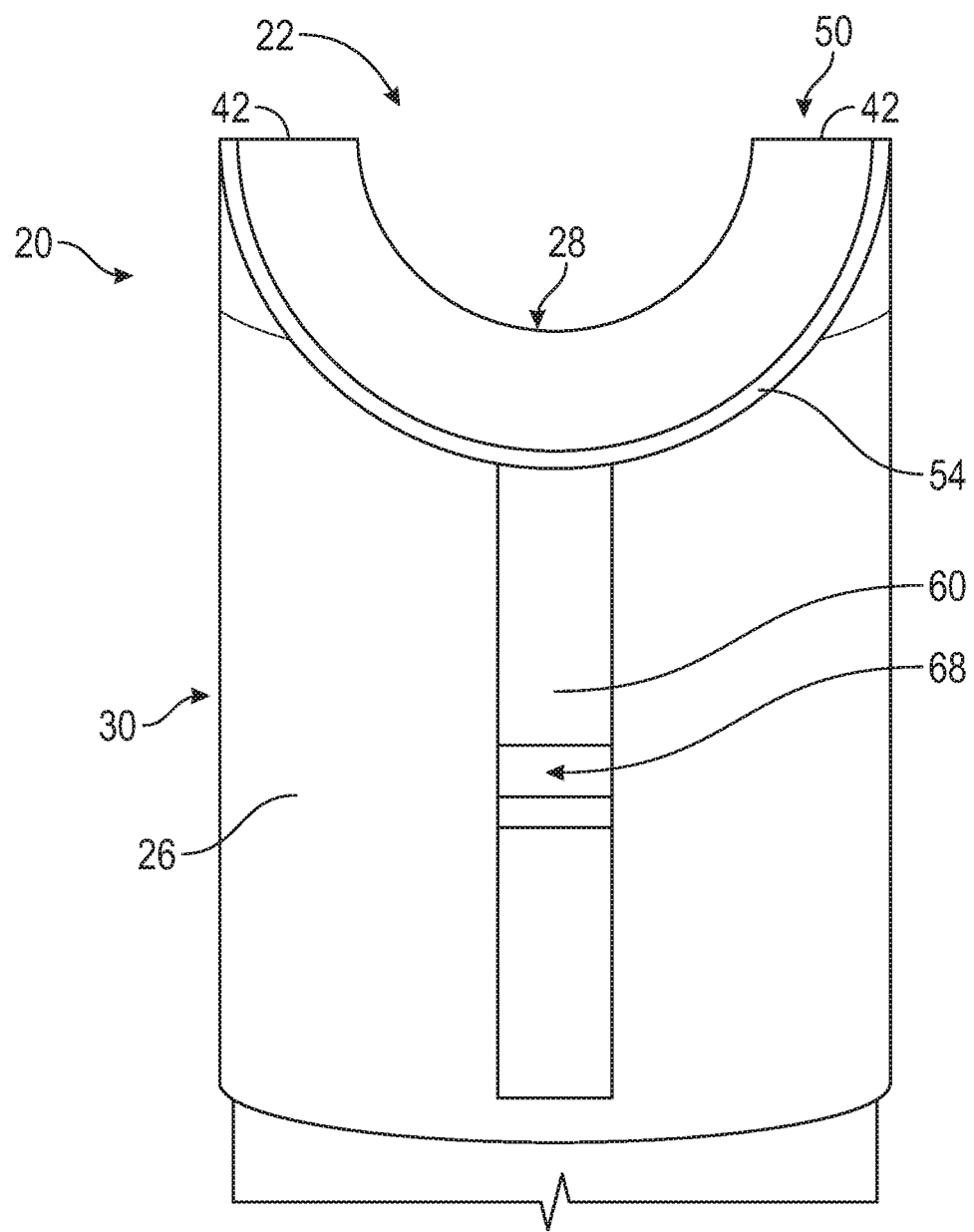
FIG. 6 is a transverse cross-section view of an example embodiment.
Figure 7:
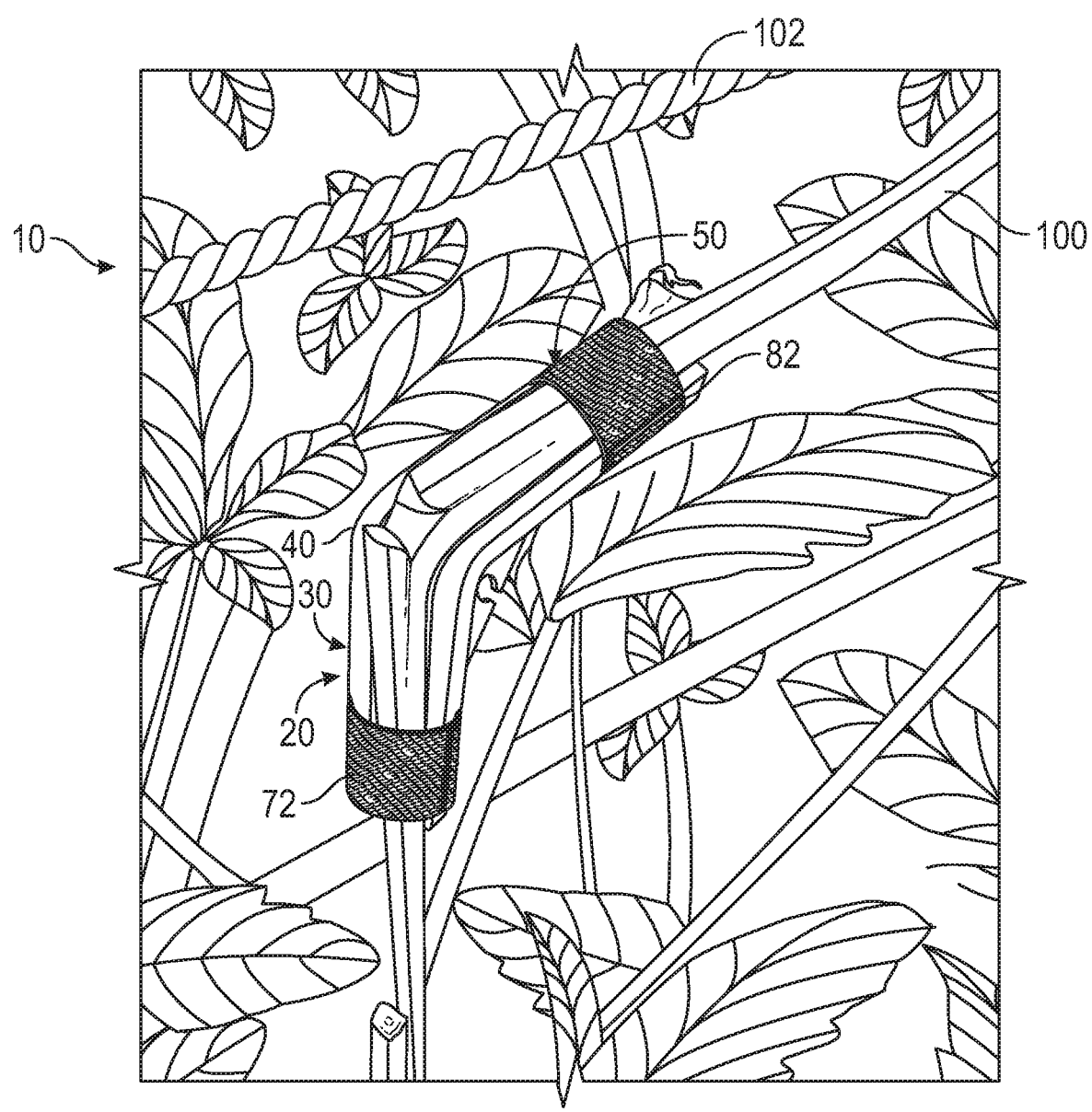
FIG. 7 is an in-use view of an example embodiment secured in supportive engagement with a plant limb to effect stress training thereof.
Figure 8:
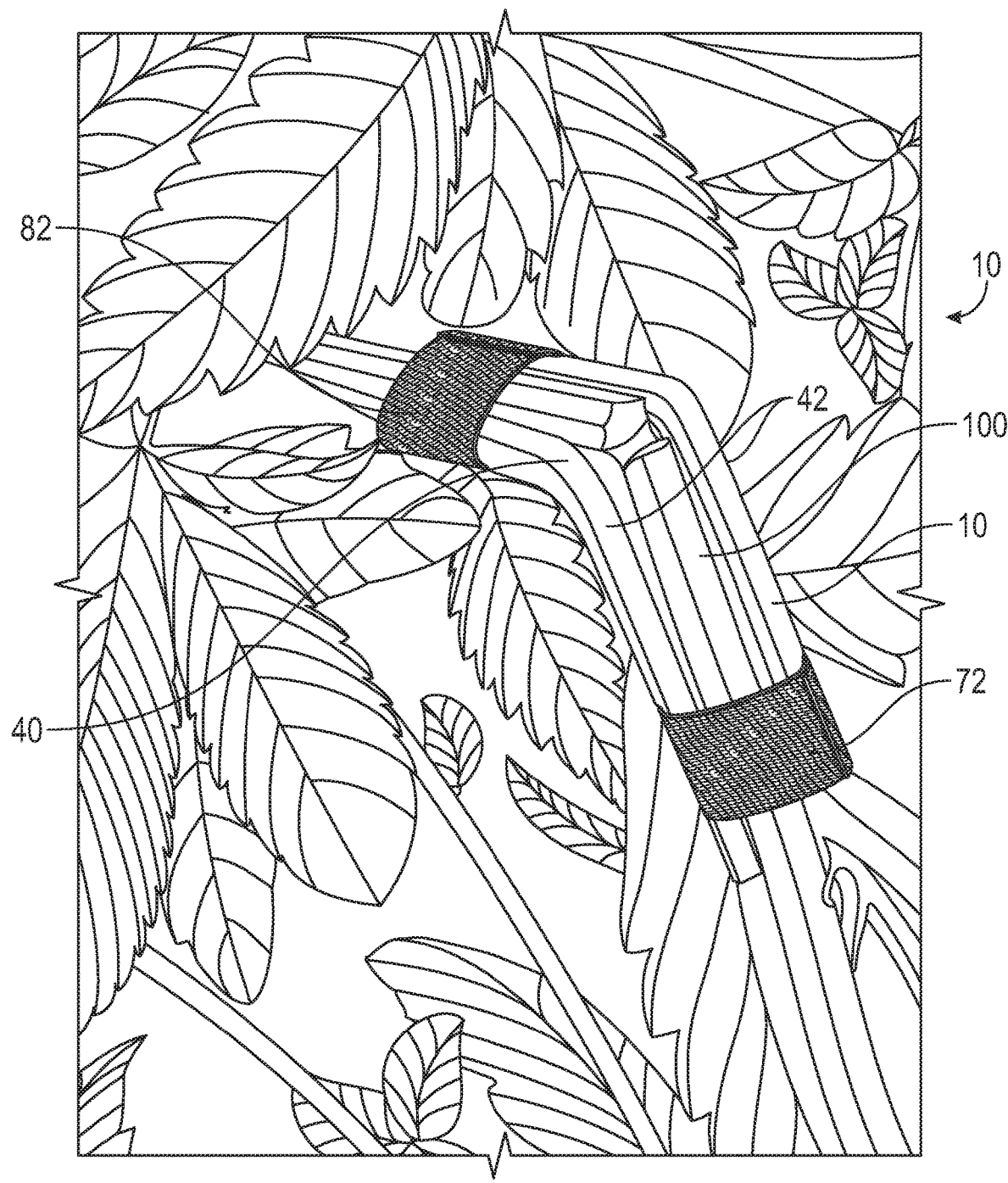
FIG. 8 is an in-use view of an example embodiment secured in supportive engagement with a plant limb to effect stress training thereof.
Figure 9:
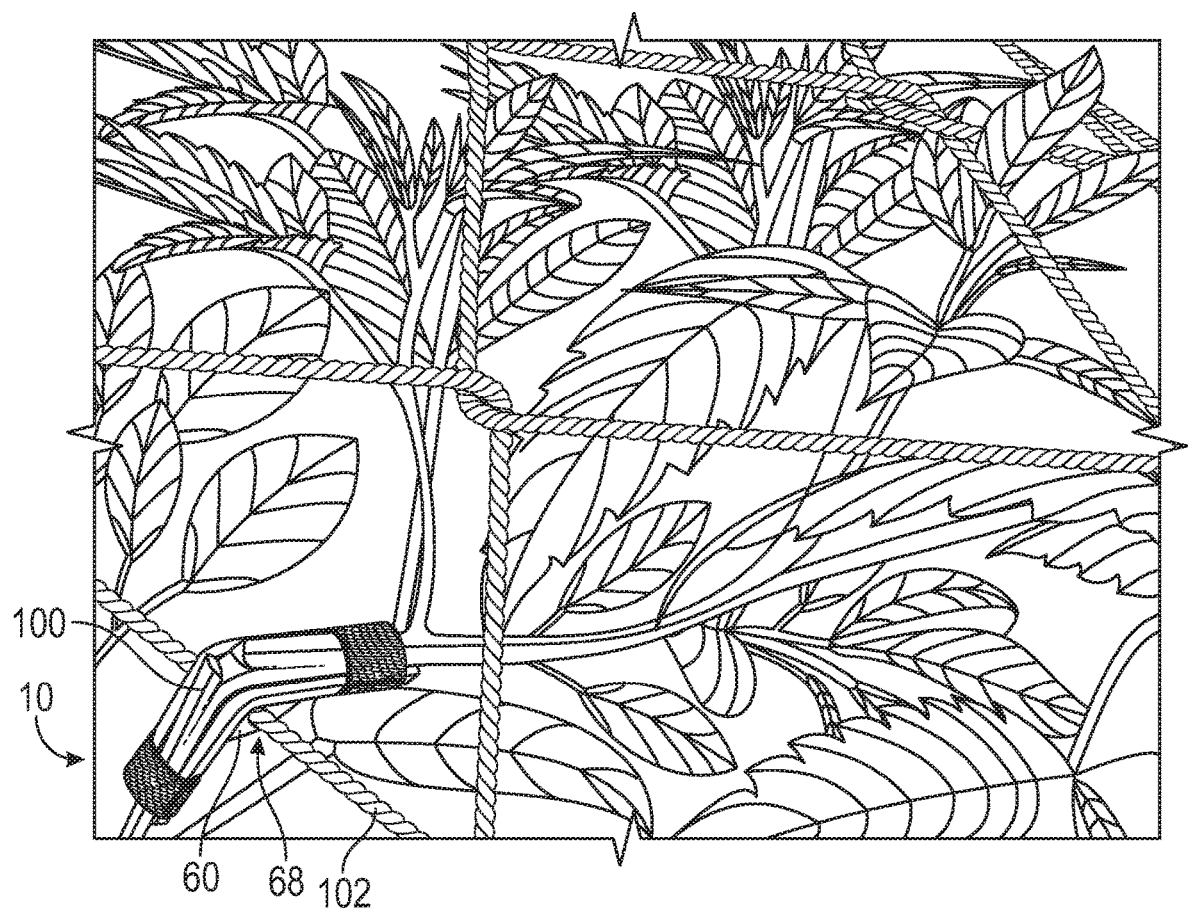
FIG. 9 is an in-use view of an example embodiment secured in supportive engagement with a plant limb and anchored to a netting line by engagement of the netting line with a triangular bracket.

With reference now to the drawings, and in particular FIGS. 1 through 9 thereof, example of the instant vegetative support and high stress training cultivation apparatus employing the principles and concepts of the present vegetative support and high stress training cultivation apparatus and generally designated by the reference number 10 will be described.

Referring to FIGS. 1 through 9 a preferred embodiment of the present vegetative support and high stress training cultivation apparatus 10 is illustrated.

A vegetative support and high stress training cultivation apparatus 10 has a body member 20 with a recessed transverse cross-section 22. In the embodiment illustrated herein the cross-section is semicircular, however other recessed cross-sections, such as U-shaped cross-sections for example, are contemplated as part of this disclosure.

A first portion 30 has a lowermost end 32 and an uppermost end 34. A knee-bend 40 is disposed at the first portion 30 uppermost end 34. A second portion 50 likewise has a lowermost end 52 and an uppermost end 54, said second portion 50 disposed at an obtuse angle relative the first portion 30 and conjoined endwise at the knee-bend 40.

An upward side 24 is disposed longitudinally upon each of the first and second portions 30, 50, from the first portion 30 lowermost end 32 to the second portion 50 uppermost end 54, and an underside 26 is likewise disposed longitudinally upon each of the first and second portions 30, 50, said underside 26 disposed in parallel with the upward side 24 from the first portion 30 lowermost end 32 to the second portion 50 uppermost end 54.

A continuous channel 28 is disposed upon the upward side 24 from the first portion 30 lowermost end 32 to the second portion 50 uppermost end 54. In a preferred embodiment depicted herein, the continuous channel 28 is ¼ to ½ inch wide and adapted to contain a plant limb 100 therein. Each of a pair of walls 42 is disposed lining the continuous channel 28 on either side.

A plant limb 100 is therefore positionable interior to the continuous channel 28 of the body member 20, when secured thereinto, and thereby maintained bent over the knee-bend 40 and along the second portion 50 at an obtuse angle relative the first portion 30. Said plant limb 100 is therefore trainable to grow away from the perpendicular, along projected growth trajectories, as will be explained subsequently. High stress training is therefore enabled to increase yield.

A triangular bracket 60 is disposed upon the underside 26 of the body member 20. The triangular bracket 60 is devised to enable anchoring of the body member 20 to existing lines 102 strung along projected growth trajectories (see for example FIG. 10). The triangular bracket 60 has a vertex 62 directly underlying the knee-bend 40 and spans a hypotenuse 64 between the first portion 30 and the second portion 50. An aperture 66 centrally disposed within the triangular bracket 60 is conjoined with a gap 68 disposed midway along the hypotenuse 64 of the triangular bracket 60. The triangular bracket 60 is therefore connectable and anchorable to existing lines 102 strung to demark projected growth trajectories and thereby tautly maintain position of the plant limb 100 secured into the continuous channel 28 (see FIG. 10).

In the preferred embodiment illustrated herein, a first recessed portion 70 is disposed exteriorly upon each of the pair of walls 42 and upon the underside 26 of the body member 20 proximal the first portion 30 lowermost end 32, said first recessed portion 70 disposed to seat a first hook and loop fastening band 72 therein flush with the remaining portion of the underside 26. A second recessed portion 80 is likewise disposed exteriorly upon each of the pair of walls 42 and the underside of the body member 20 proximal the second portion 50 uppermost end 54, said second recessed portion 80 disposed to seat a second hook and loop fastening band 82 therein flush with the remaining portion of the underside 26. Each of the first and second hook and loop fastening bands 72, 82 are adhered or otherwise affixed into the corresponding first or second recessed portion 70, 80 respectively. Each of the first and second hook and loop fastening bands 72, 82 includes at least one end devised to wrap overtop the continuous channel 28 and releasably fasten to said hook and loop fastening band 72, 82 to secure around a plant limb 100 disposed interior to the continuous channel 28. The body member 20 is thereby releasably securable to maintain the plant limb 100 interior to the continuous channel 28 up the first portion 30, over the knee-bend 40, and then along the second portion 50 of the body member 20 at an obtuse angle relative the first portion 30. Plant limbs 100 and stems are thereby directable away from the perpendicular and forced and maintained along projected growth trajectories.

In a preferred embodiment herein illustrated, the obtuse angle between the first and second portions 30, 50 is between 100° and 110°. Each of the first portion 30 and the second portion 50 is at least one inch in length. The aperture 66 in the triangular bracket 60 is 0.16" in diameter (sized to engage a growth line strung along a projected trajectory) and the gap 68 is 0.08".

What is claimed is:

1. A vegetative support and high stress training cultivation apparatus comprising:
   a body member having a recessed transverse cross-section, said body member comprising:
      a first portion having a lowermost end and an uppermost end;
      a knee-bend disposed at the first portion uppermost end;
      a second portion having a lowermost end and an uppermost end, said second portion disposed at an obtuse angle relative the first portion and conjoined endwise at the knee-bend;
      an upward side disposed longitudinally upon each of the first and second portions, from the first portion lowermost end continuously to the second portion uppermost end;
      an underside disposed longitudinally upon each of the first and second portions, said underside disposed in parallel with the upward side from the first portion lowermost end continuously to the second portion uppermost end;
      a continuous channel disposed upon the upward side from the first portion lowermost end continuously to the second portion uppermost end;
      each of a pair of walls disposed lining the continuous channel on either side;
   a triangular bracket disposed upon the underside of the body member, said triangular bracket having a vertex directly underlying the knee-bend and spanning a hypotenuse between the first portion and the second portion;
   an aperture centrally disposed within the triangular bracket; and
   a gap disposed midway along the hypotenuse of the triangular bracket, said gap conjoined with the aperture;
   wherein a plant limb is oriented along the continuous channel of the body member when secured thereinto, thereby bent over the knee-bend and along the second portion at an obtuse angle relative the first portion, whereby a plant limb is trainable to grow away from the perpendicular along projected growth trajectories to enable high stress training and increased yield; and
   wherein said triangular bracket is connectable and anchorable to existing lines strung to demark projected growth trajectories and tautly maintain position of the plant limb limp secured into the continuous channel.

2. The vegetative support and high stress training cultivation apparatus of claim 1 wherein the body member further comprises:
   a first recessed portion disposed exteriorly upon each of the pair of walls and the underside proximal the first portion lowermost end, said first recessed portion disposed to seat a first hook and loop fastening band; and
   a second recessed portion disposed exteriorly upon each of the pair of walls and the underside proximal the second portion uppermost end, said second recessed portion disposed to seat a second hook and loop fastening band;
   wherein the plant limb is securable into the continuous channel by action of the first and second hook and loop fastening bands.

3. The vegetative support and high stress training cultivation apparatus of claim 2 wherein the obtuse angle between the first and second portions is 100° to 110°.

4. The vegetative support and high stress training cultivation apparatus of claim 3 wherein each of the first portion and the second portion is at least one inch in length.

5. The vegetative support and high stress training cultivation apparatus of claim 4 wherein the aperture in the triangular bracket is 0.16" in diameter.

6. The vegetative support and high stress training cultivation apparatus of claim 5 wherein the gap is 0.08".

7. The vegetative support and high stress training cultivation apparatus of claim 6 wherein the continuous channel has a width of between ¼ to ½ inches.

8. A vegetative support and high stress training cultivation apparatus comprising:
   a hemicylindrical body member having a recessed transverse cross-section, said body member comprising:
      a first portion having a lowermost end and an uppermost end;
      a knee-bend disposed at the first portion uppermost end;
      a second portion having a lowermost end and an uppermost end, said second portion disposed at 100° to 110° relative the first portion and conjoined endwise at the knee-bend;
      an upward side disposed longitudinally upon each of the first and second portions from the first portion lowermost end continuously to the second portion uppermost end;
      an underside disposed longitudinally upon each of the first and second portions, said underside disposed in parallel with the upward side continuously from the first portion lowermost end to the second portion uppermost end;
      a continuous channel disposed upon the upward side continuously from the first portion lowermost end to the second portion uppermost end;
      each of a pair of walls disposed lining the continuous channel on either side;
   a first recessed portion disposed exteriorly upon each of the pair of walls and upon the underside proximal the first portion lowermost end, said first recessed portion disposed to seat a first hook and loop fastening band;
   a second recessed portion disposed exteriorly upon each of the pair of walls and upon the underside proximal the second portion uppermost end, said second recessed portion disposed to seat a second hook and loop fastening band; and
   a triangular bracket disposed upon the underside of the body member, said triangular bracket having a vertex disposed directly underlying the knee-bend and spanning a hypotenuse between the first portion and the second portion, said triangular bracket having an aperture centrally disposed therein which aperture is conjoined with a gap disposed midway along the hypotenuse, said bracket thereby connectable and anchorable to existing lines demarking projected growth trajectories;

wherein a plant limb is oriented along the continuous channel of the body member when secured thereinto by action of the first and second hook and loop band, thereby bent over the knee-bend and along the second portion at an obtuse angle relative the first portion, whereby a plant limb is trainable to grow away from the perpendicular along projected growth trajectories to enable high stress training and therefore increased yield.

\* \* \* \* \*